United States Patent [19]

Wilmot

[11] 4,047,503
[45] Sept. 13, 1977

[54] DRINKING STATIONS FOR POULTRY AND THE LIKE

[75] Inventor: Kenneth Wilmot, Clitheroe, England

[73] Assignee: Neotechnic Engineering Limited, Clitheroe, England

[21] Appl. No.: 683,033

[22] Filed: May 4, 1976

[30] Foreign Application Priority Data

May 7, 1975   United Kingdom ............... 19275/75

[51] Int. Cl.² ............................................. A01K 7/02
[52] U.S. Cl. .................................................. 119/75
[58] Field of Search ........................... 119/75, 72.5, 74

[56] References Cited

U.S. PATENT DOCUMENTS

| | | | |
|---|---|---|---|
| 2,250,759 | 7/1941 | Gardner | 119/74 |
| 2,319,928 | 5/1943 | Hart | 119/75 |
| 3,505,978 | 4/1970 | Nilsen | 119/75 |
| 3,563,207 | 2/1971 | Kofford | 119/75 |

*Primary Examiner*—Hugh R. Chamblee
*Attorney, Agent, or Firm*—Young & Thompson

[57] ABSTRACT

A drinking station for poultry or the like is connected to a liquid supply pipe by a valve that is operable to supply the liquid to a plurality of enclosures within a receptacle that also contains the valve. The valve is operable by the poultry by means of a tongue extending from a valve sleeve. The valve is spring-loaded towards a closed position against a valve cap.

10 Claims, 2 Drawing Figures

U.S. Patent   Sept. 13, 1977   4,047,503
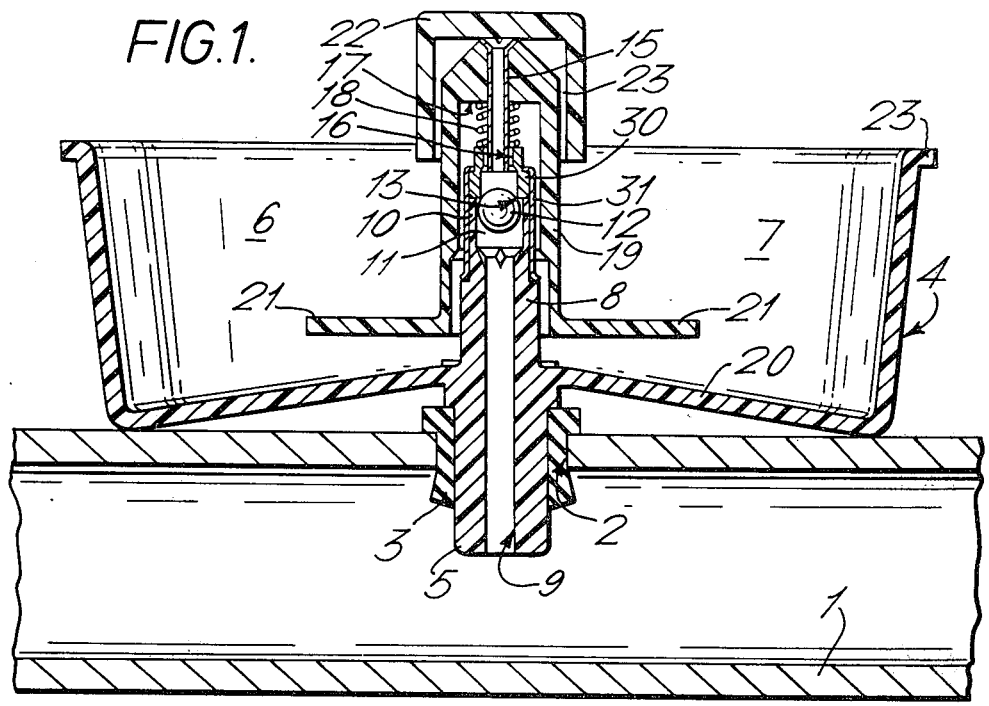
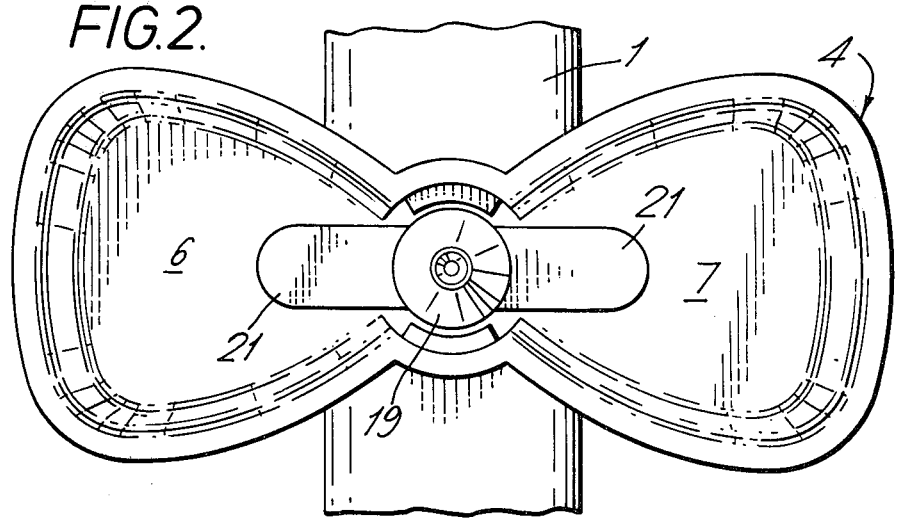

DRINKING STATIONS FOR POULTRY AND THE LIKE

This invention relates to drinking stations for poultry or the like, of the kind which include a valve for operation by the poultry to effect delivery of water or other liquid from a supply.

According to the invention there is provided a drinking station for poultry or the like, arranged for cooperation with a supply of drinking liquid wherein a valve is operable to supply the liquid to a plurality of enclosures.

Each enclosure may be provided by a substantially cup-shaped receptacle, and the receptacles can conveniently be formed in an integral construction from, for example, moulded polypropylene.

A hollow stem may be provided at the station for sealing engagement with a liquid supply pipe, such that the station may be rotatably mounted on the pipe.

The valve may be operable by downward pressure on a movable element within at least one of the enclosures. The or each movable element may comprise a tonque projecting into a respective one of the enclosures and extending internally thereof, preferably at a position above the tongues, which will normally be at or below the level of liquid in the enclosure.

A drinking station in accordance with the present invention will now be described, by way of example, with reference to the accompanying drawing, which shows:

FIG. 1 a cross-section through the station, having a valve arrangement integral with a double drinking cup and mounted on a water supply pipe; and FIG. 2 a plan view of the station of FIG. 1, rotated on the pipe through 90° with respect to the view of FIG. 1.

Referring to FIGS. 1 and 2, a pipe 1 conveys water from a drinking water supply (not shown) to a plurality of double drinking stations, one of which is shown in the drawing. At each double drinking station a hole 2 is formed in the wall of the pipe and a sealing washer or grommet 3 fitted therein. A drinking cup 4 has a stem 5 projecting through the washer 3 so that a duct 9 extending through the stem is in communication with the interior of the pipe 1. The cup 4 defines two identical drinking enclosures 6 and 7 disposed on either side of the continuation 8 of the stem 5 into the cup 4. The enclosures 6 and 7 may or may not be in liquid communication with each other, for example by appropriate shaping of the cup 4.

The stem 5 and its continuation 8 communicate the interior of the pipe 1 with the cup 4 through a valve arrangement. Towards the upper end 10 of the stem 5 the duct 9 is broadened to provide a valve chamber 11. A ball valve member 12 is disposed within the chamber 11 and a valve seat 13 is provided for the valve member 12 at the upper end of the chamber 11 by an end fitting 30 that abuts the end 10 of the stem 5 and is fixed thereto by an external stainless steel sheath 31.

A tube 15 passes into the outlet 16 of the stem 5 at the end fitting 30, and is restricted in its penetration of the stem 5 by an external shoulder 17 which abuts a coil spring 18 disposed around the tube 15 and seating on the free end of the end fitting 30. The radially extending shoulder 17 terminates in a substantially tubular member 19 that extends co-axially with the stem 5 back towards the base 20 of the cup 4. At its inner end the tubular member 19 is terminated by two tongues 21 that extend radially of the tubular portion of the member 19 into respective ones of the enclosures 6 and 7. A cap 22 fits over the open outer end of the tube 15 and is supported on an extension (not shown) of the outer rim 23 of the cup 4.

The arrangement as shown is in its non-operative position, that is to say, no liquid can flow from the pipe 1 into the enclosures 6 and 7. The ball valve member 12 is biased upwards on to its valve seat 13 by the pressure of water in the supply to provide a watertight seal.

In operation, one or other, or both, of the tongues 21 is depressed by the beak of, say, a chicken towards the base 20 of the cup 4. The tube 15 is thus pushed further into the stem 5, and dislodges the ball valve member 12 from the valve seat 13, thus allowing water to flow under prssure through the duct 9 through the chamber 11, passed the ball valve member 12 and through the outlet 16. After passing the valve member 12, the water flows through the outlet 16, through the tube 15 and then via the annular region 23 between the tubular member 19 and the cap 22 into the enclosures 6 and 7.

Release of the tongue 21 causes the member 19 and thus the tube 15 to be pushed away from the stem 5 under the action of the spring 18, and the ball valve member 12 to be reseated on its valve seat 13 under the action of pressure of water from the pipe 1 and duct 9.

Repeated or continued depression of the tongue 21 causes further quantities of water to be transferred from the pipe 1 through the duct 9 into the drinking enclosures 6 and 7.

It is thus seen that because of the combination of one valve arrangement with two drinking enclosures, only one valve arrangement need be provided in order to feed two chickens, but that the arrangement can nevertheless be used to provide water for a single chicken, or other poultry. The arrangement is thus simple and at the same time versatile.

Moulded polypropylene has been found to be a particularly suitable material for the majority of the components of the arrangement. However, the ball valve member 12, end fitting 30 providing the valve seat 13, spring 18, and tube 15, as well as the sheath 31, may conveniently be made from metal, for example stainless steel. In operation, the tongues 21 are pecked by beaks, and it is desirable that the tongues, and at least other components so affected, are made from a suitably durable material. Other plastic materials, may be used, and glass filled nylon may be a particularly suitable material It is seen that with such an arrangement, any air in the system is expelled in advance of the flow of water into the drinking enclosures 6 and 7; no separate airbleeding operation is required.

A further advantage of the present invention arises from the dispersion of the valve water outlet above the level of the rim 23 of the cup 4, since no food particles floating on the water can block up the valve arrangement.

The grommet fixing of the cup 4 in the pipe 1 allows the cup to be oriented at any angle, in a horizontal plane, with respect to the pipe 1. That is to say, the cup 4 can be set at any angle about its vertical axis. Two such settings are shown in the drawing.

With the cup 4 extending by its stem 5 into the upper part of the wall of the pipe 1, any sludge flowing through the pipe tends to be kept away from the valve arrangement, thus reducing the risk of blockage.

I claim:

1. A drinking station for poultry or the like, the drinking station comprising a plurality of receptacles for receiving a drinking liquid, and valve means adapted to control the flow of the drinking liquid from a supply thereof into said receptacles, said valve means comprising a sleeve, a tongue extending laterally from said sleeve into one of said receptacles, and a valve-operating member projecting internally of said sleeve, said valve means being operable to supply the liquid to the receptacles in response to downward pressure on said tongue.

2. A drinking station according to claim 1 wherein the receptacles are connected to one another such as to enclose the valve means therebetween.

3. A drinking station according to claim 2 wherein said receptacles have floors sloping downwardly away from said valve means.

4. A drinking station according to claim 1, comprising a hollow stem adapted to project downwardly into a liquid supply pipe.

5. A drinking station according to claim 4, comprising means for sealing the stem to the liquid supply pipe such that the receptacles are rotatable with respect thereto.

6. A drinking station according to claim 1 having a fixedly-mounted valve cap and wherein when the valve means is in its closed position the sleeve is biassed into abutment with said valve cap further to prevent liquid flow through the valve means.

7. A drinking station according to claim 1 wherein the valve means comprises a valve seat and a closure member, said closure member being adapted to be biassed onto said valve seat by the pressure of the liquid in the supply tank.

8. A drinking station according to claim 1, wherein the valve-operating member is a hollow tube arranged on operation of the valve to dislodge the valve closure member from said valve seat so as to allow liquid to flow from the supply through the valve tube into the receptacles.

9. A drinking station according to claim 8, wherein the outer end of the valve-operating member is arranged to be above the level of liquid in the receptacles.

10. A drinking station according to claim 1 having a pair of said receptacles with said valve means located therebetween, and a tongue extending laterally from said sleeve into the other of said receptacles, said receptacles each having a floor sloping downwardly away from said valve means.

* * * * *